Jan. 12, 1960     D. C. PORTER     2,920,640
HYDRAULIC INJECTION PUMP
Filed Aug. 12, 1957     4 Sheets-Sheet 1
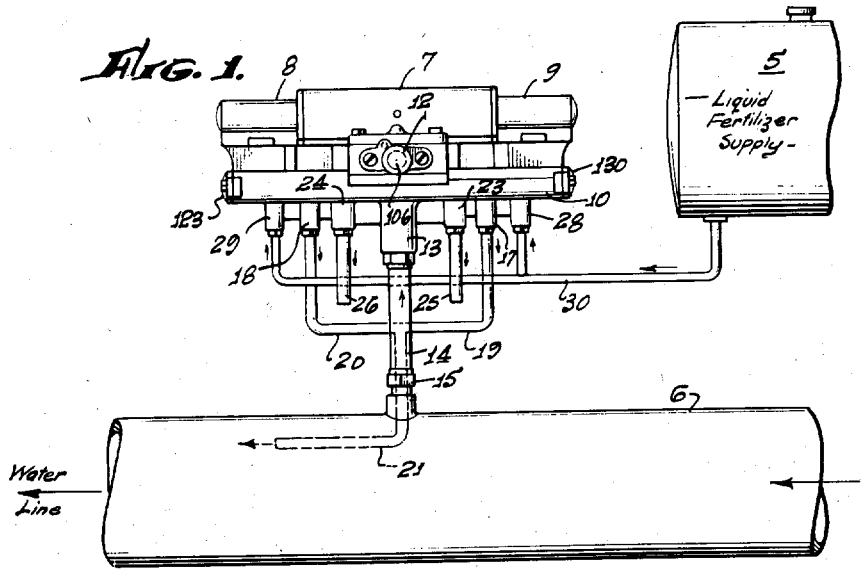
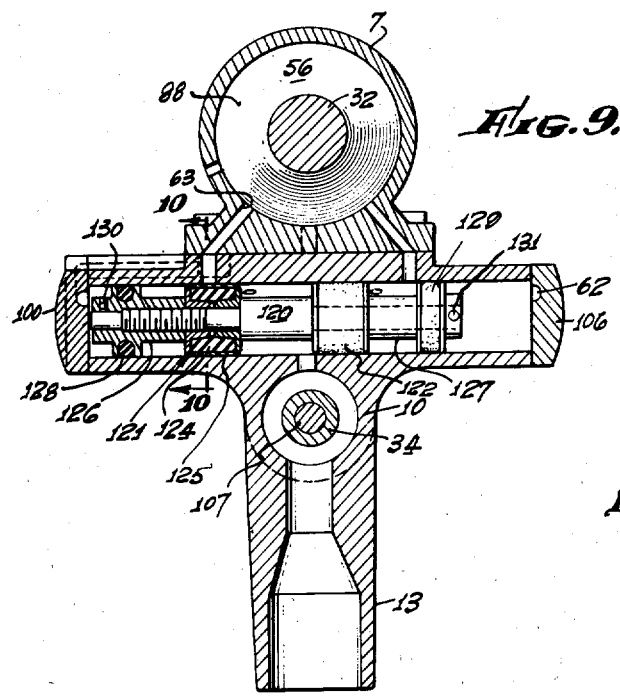
DONALD C. PORTER,
INVENTOR.
BY Orl R. Goshaw
ATTORNEY.

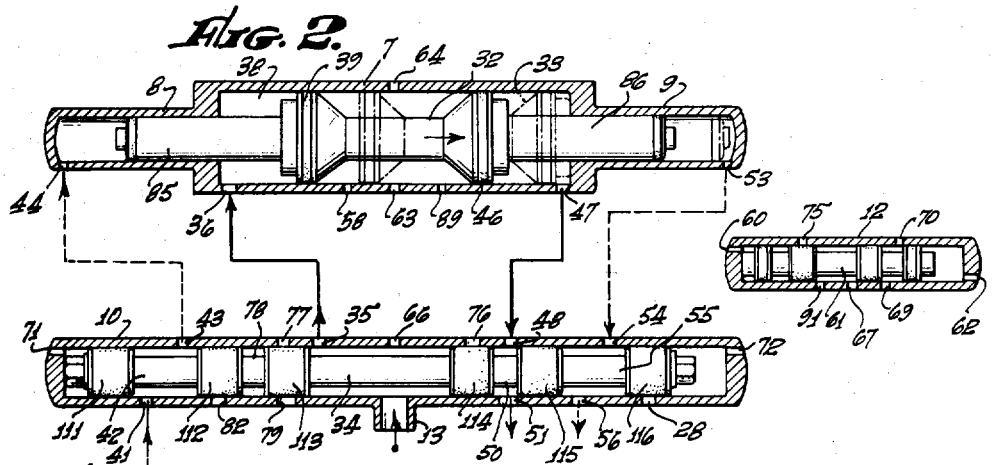
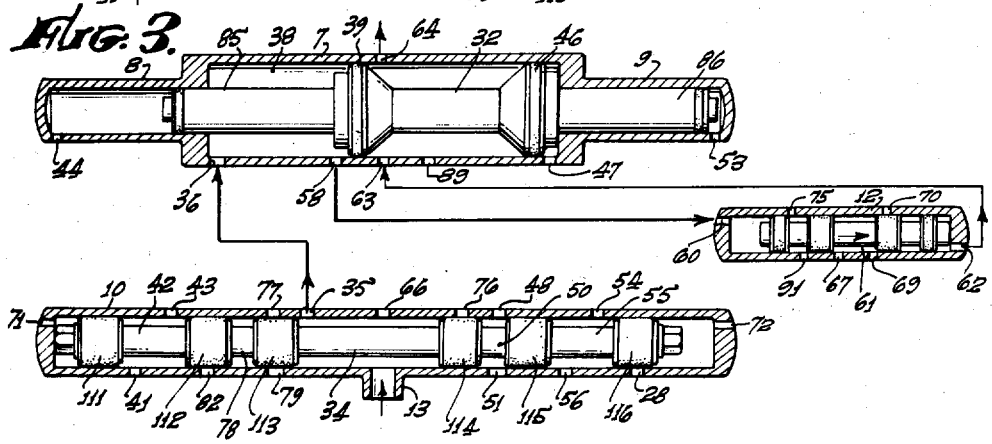
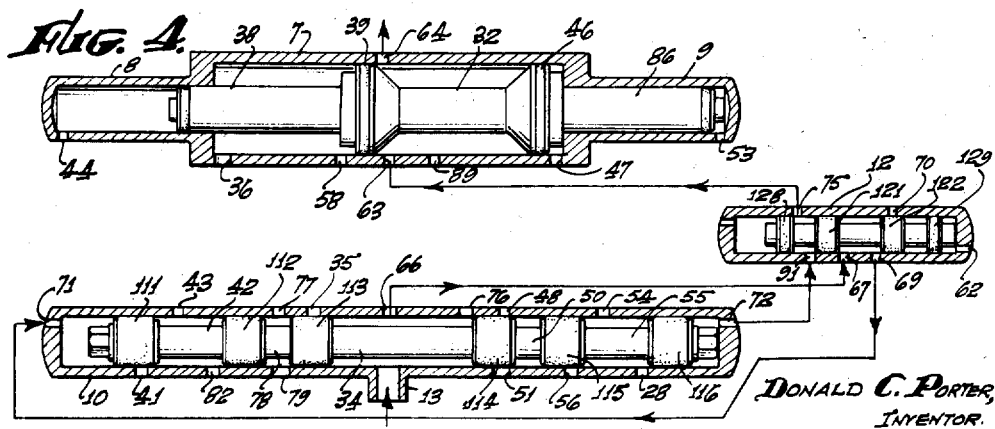

Jan. 12, 1960   D. C. PORTER   2,920,640
HYDRAULIC INJECTION PUMP
Filed Aug. 12, 1957   4 Sheets-Sheet 3
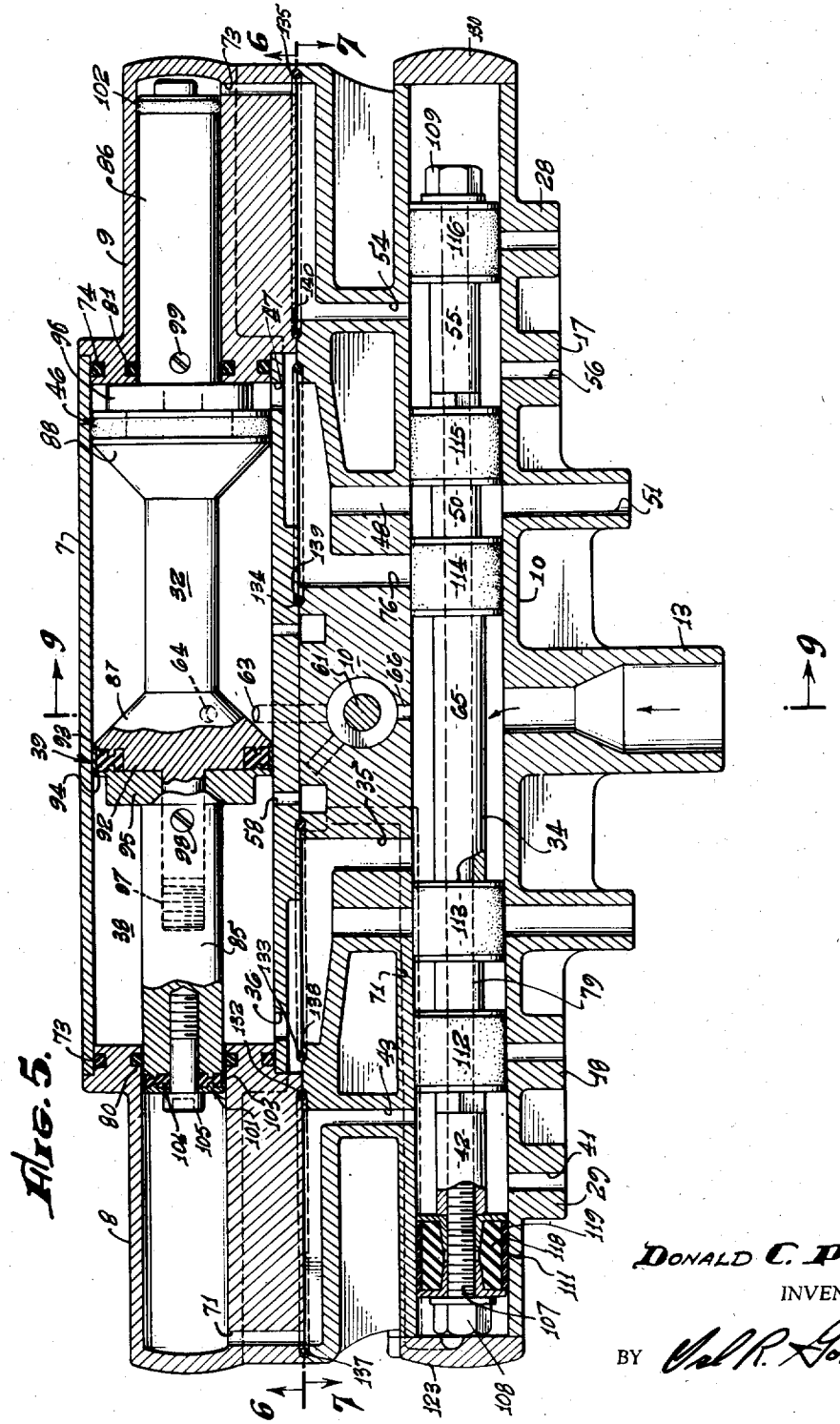
DONALD C. PORTER,
INVENTOR.
BY
ATTORNEY.

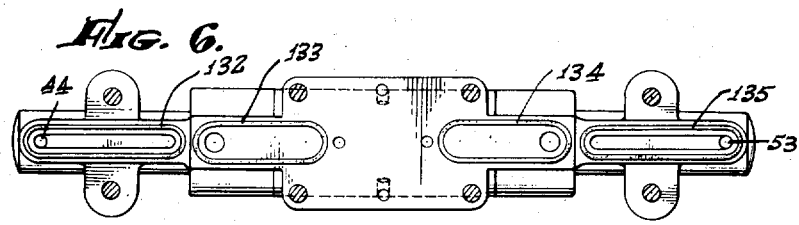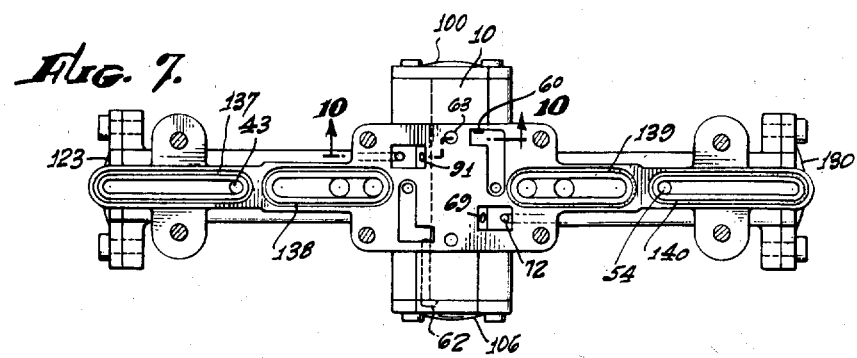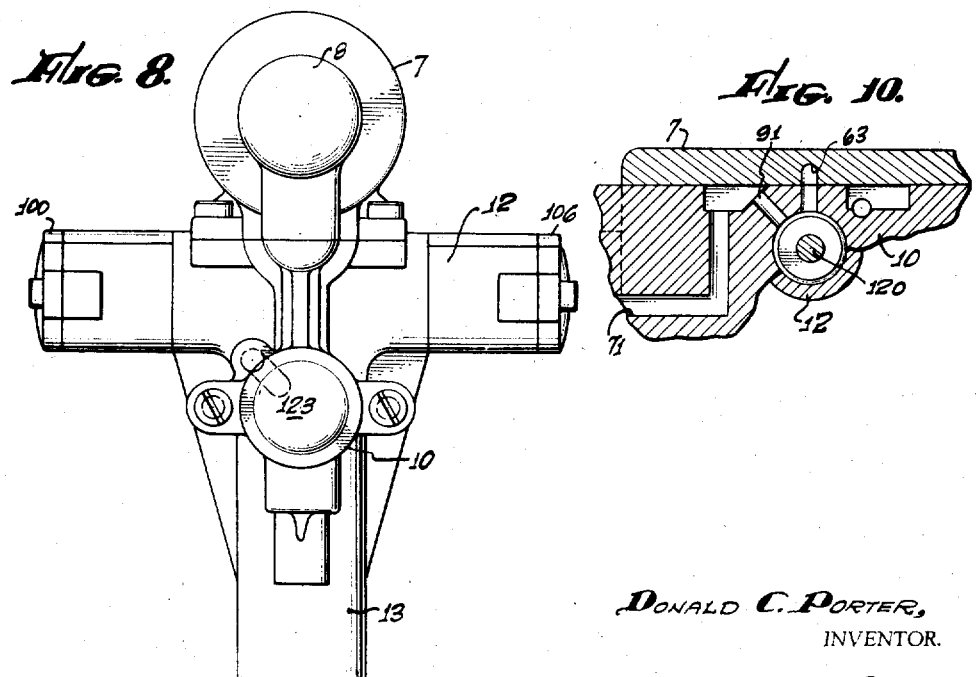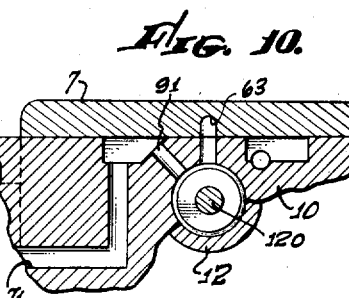

United States Patent Office 2,920,640
Patented Jan. 12, 1960

2,920,640

HYDRAULIC INJECTION PUMP

Donald C. Porter, Arcadia, Calif., assignor to Jay Q. Davis, Los Angeles, Calif.

Application August 12, 1957, Serial No. 677,576

14 Claims. (Cl. 137—99)

This invention relates to injection systems and particularly to hydraulic-operated pumps for injecting one liquid into another, such as a liquid fertilizer into irrigation water.

In the past, electrical pumps have been tried, but electrical energy is not always available at the location desired and they do not maintain a constant mixture ratio. Also, high pressure tanks of gas to force liquid fertilizer into high pressure water systems have been tried. Many of these prior systems have not been successful because of the action which occurs when fertilizer is forced into the water line under high pressure. Liquid fertilizer contains minerals, such as calcium, sulphur, iron, etc., and usually has a pH of around 2. Under pressure, some of these minerals precipitate out and coat the walls of cylinders and clog up ball-check and other types of valves. This, of course, interferes with the action of the mechanism.

The present invention is directed to a simple hydraulic-operated motor which is not subject to clogging caused by precipitation of the minerals in the fertilizer, nor does the silt in the water interfere with its operation. To prevent such interference, the valves, which open and close the various ports, are of the sliding type in which pressure is applied to a sleeve of Teflon or similar material. In this manner, the precipitated minerals cannot get between the sleeve and the walls of the cylinder. The fertilizer is thus confined to the spool areas and is carried away with the flowing fertilizer. The same action occurs in the water sections of the pump, the silt being carried away with the water while prevented from getting between the cylinder walls and sleeves by pressure on the sleeves against the walls of the cylinders. Since the sleeves are of the sliding type, they are self-cleaning.

The device is self-contained and fully enclosed so that dirt, dust, or any foreign matter cannot get into the mechanism. The pump is self-energizing from the main water pressure and is adapted to be easily attachable to the regular standard high pressure overhead sprinkler lines, which may be from ¼ mile to ½ mile long. The manner of injecting the liquid fertilizer into the main water line provides a uniform mixing ratio and reduces mineral deposits in the sprinkler heads.

The principal object of the invention, therefore, is to facilitate the injection of materials into a pipe line.

Another object of the invention is to provide an improved hydraulic-operated pump for injecting one fluid into another fluid.

A further object of the invention is to provide an improved hydraulic-operated water pump which injects liquid fertilizer into irrigation water.

A still further object of the invention is to provide a multi-unit hydraulic-operated pump fully enclosed and which is not subject to the deposit of precipitated minerals from the liquid fertilizer or from the silt in the water line.

A better understanding of this invention may be had from the following detailed description when read in connection with the accompanying drawings, in which:

Fig. 1 is a front elevational view of the pump showing the connections to a liquid fertilizer supply and the high pressure water line.

Fig. 2 is a diagrammatic view of the several cylinders with their piston and valves in one position.

Fig. 3 is a diagrammatic view showing the piston and valves in another actuated position.

Fig. 4 is a diagrammatic view showing the piston and valves in a third actuated position.

Fig. 5 is a cross-sectional view of the cylinders and a partial cross-section view of the valves.

Fig. 6 is a bottom view of the power-chemical cylinder castings taken along the line 6—6 of Fig. 5.

Fig. 7 is a top view of the main valve casting taken along the line 7—7 of Fig. 5.

Fig. 8 is an end view of the pump unit.

Fig. 9 is a cross-sectional view of the castings assembled and a partial cross-sectional view of the pilot valve taken along the line 9—9 of Fig. 5, and Fig. 10 is a detail view through the pilot valve taken along the line 10—10 of Fig. 7.

Referring now to the drawings in which the same reference numerals indicate the same elements, Fig. 1 shows the over-all appearance of the pump connected to a liquid fertilizer supply 5 and a main water line 6. The pump has an upper power cylinder 7 with end fertilizer cylinders 8 and 9. Parallel with the cylinders 7, 8, and 9 is a multiple valve cylinder 10 between which is a pilot valve cylinder 12, the pilot valve cylinder being positioned at right angles to the other cylinders just mentioned. Under the main valve cylinder 10 is the main inlet 13 to the pump which is connected by a pipe 14 and coupling 15 to the main water line 6. Outlets 17 and 18 are connected together by respective pipes 19 and 20 and to a T pipe 21 within the main water pipe 14. The outlet of pipe 21 is past the inlet to the pump in the direction of flow of water in pipe 6, to prevent the acid fertilizer from entering the water sections of the pump. Outlets 23 and 24 are connected to respective discharge pipes 25 and 26. Fertilizer inlets 28 and 29 are connected together by a pipe 30 to the liquid fertilizer supply tank 5.

The operation of the cylinders and their piston and valves are diagrammatically illustrated in Figs. 2, 3, and 4, and will now be referred to before reference to the details of the pump in the remaining figures.

In Fig. 2, a power cylinder power piston 32 in the form of a spool is shown half way between its limiting positions, the right hand limiting position being shown by dotted lines 33. The movement of the piston 32 to the right is provided by water under the line pressure entering the inlet 13 of main valve cylinder 10, passing around a small diameter section 34 of the main cylinder valve, out port 35, into port 36 of power cylinder 7 and into a space 38 behind the left hand seal 39 of power piston 32, as shown by the solid arrow. The entire piston is thus moved to the right.

During the movement of piston 32 to the right, liquid fertilizer is drawn from inlet 29 through port 41 in main cylinder 10 around the small diameter portion 42 of the main cylinder valve, out port 43 and into port 44 of fertilizer cylinder 8, as shown by the dotted arrow. Also during the movement of piston 32 to the right, any water between the right hand seal 46 of the piston and the right hand end of the power cylinder is forced out of port 47, into port 48 of the main cylinder 10, around the small diameter portion 50 of the main cylinder valve, and out port 51 to discharge pipe 25, as shown by the solid arrow. Simultaneously, any fertilizer in the fertilizer piston will be forced out of port 53, into port 54, around a small diameter section 55 of the main cylinder valve, out port 56 into pipe 19 connected with pipe 21 in the main water line 6, as shown by the dotted arrow.

Now referring to Fig. 3 showing the piston 32 in its extreme right hand position in power cylinder 7 and fertilizer cylinders 8 and 9, it will be noted that a port 58 has now been uncovered by left hand seal 39 of piston 32 so that the water between the seal 39 and the left hand end of power cylinder 7 will now pass out of port 58 and into a port 60 of pilot valve cylinder 12, as shown by the arrow. This will cause the valve 61 in the pilot valve cylinder to move to the right to the position shown in Fig. 3. Any water between the right hand end of valve 61 and the right hand end of pilot valve cylinder 12 will be forced out of port 62, into port 63 of cylinder 7, around the small diameter section of the power piston 32 and be discharged out of port 64 which is never closed regardless of the position of piston 32. (See arrow.)

The next operational step is illustrated in Fig. 4 wherein the movement of the pilot valve 61 to the right permits a flow of water from the main inlet 13 around the small diameter section 34 of the main cylinder valve, out port 66, into port 67 of pilot valve cylinder 12, around the small diameter central section of the pilot valve, out port 69, and into port 71 of the main valve cylinder 10, as shown by the arrow. This water pressure moves the main cylinder valve to the right to the position shown in Fig. 4. During the movement of the main cylinder valve to the right, the water between the right hand end of the valve and the end of the cylinder 10 is forced through port 72 and into port 91 and out of port 75 of pilot valve cylinder 12 and into port 63, around the small diameter section of the power cylinder piston 32 and out port 64 as shown by the arrows.

The above action illustrated in Figs. 2, 3, and 4 is one half of a complete cycle of operation of the power piston and the respective valves. It will be noted that when the half cycle just described commenced, the valve of main cylinder 10 was to the left, as shown in Fig. 2, which opened port 35 to port 36. With this main cylinder valve to the right, as shown in Fig. 4, outlet port 76 connects with inlet port 47 of power cylinder 7 to start the power cylinder piston to the left. It will be noted that outlet ports 48 and 51 are now closed by the main cylinder valve seal 114, port 56 is closed by seal 115, and port 41 is closed by seal 111. The movement of the power cylinder to the left will then force the fertilizer out of cylinder 8, through port 44, and into port 43 of the main cylinder where it will pass around the small diameter section 42 of the main cylinder valve and out port 82 to the pipe 20 and into the main water line 6.

During this period, the liquid fertilizer will be drawn into cylinder 9 from port 28, around small diameter section 55 of the main cylinder valve, out port 54 and into port 53. When the power cylinder piston 32 has moved to its extreme left, the water behind seal 46 will exit from the power cylinder 7 at the port 89 and into port 62 of the pilot valve cylinder 12, moving the pilot valve 61 to the left. During this action, the water behind the seal 39 of piston 32 will exit through port 36 into port 77, around small diameter section 78 and out port 79 to discharge pipe 26. With the pilot valve piston 61 in its extreme left hand position, the water will flow from port 66 into port 67 as previously described, around the small diameter central section of the pilot valve 61 and out port 91 to port 72, moving the main cylinder valve to the left at the position shown in Fig. 2. The water to the left of the pilot valve will exit through port 60 to port 63 and be discharged through port 64. The water to the left of the main cylinder valve will exit through port 71 of cylinder 10 into port 69 and out port 70 of pilot valve cylinder 12, into port 63 and out through port 64. This completes one cycle of the pump.

In the above described cycle of operation of the piston and valves, the pilot valve and main valve are always balanced except for water pressure on the ends of the valves. That is, water from inlet 13 in cylinder 10 is balanced against seals 113 and 114, the fertilizer between ports 41 and 43 and water between ports 43 and 82 are balanced against seals 111 and 112. Also the discharge water between ports 77 and 79 is balanced by seals 112 and 113. The same balancing occurs in the right portion of cylinder 10. In pilot valve cylinder 12 seals 121 and 122 balance the valve for water to cylinder 10 and these seals and the O rings 128 and 129 balance the water from cylinder 10 to cylinder 7. (See Fig. 4.)

To set forth the dimensions of a preferred pump which is satisfactory for operation on an 8 inch line with overhead sprinklers, the main cylinder 7 has an internal diameter of approximately 1½ inches, and end cylinders 8 and 9 are of approximately ¾ inch internal diameter. The stroke of the piston in these cylinders is approximately 2 inches. Since the average working pressure in most 8 inch main water lines runs about 65 pounds per square inch, it is necessary to boost the pressure of the chemical being injected above this pressure, a 2 to 1 ratio being preferred as a safety factor to obtain the desired injection volume. The 1½ inch diameter bore of the cylinder 7 has an area of approximately 1.76 square inches and deducting the area of the ¾ diameter piston, or .44 square inches, there is a net of 1.32 square inches being applied as a force to the power piston. The total power force, therefore, is 65 times 1.32 effective square inches, or a total force of approximately 85.8 pounds. Dividing this by .44 square inches, the area of the cylinders 8 and 9, the pressure on the chemical pump is 195 pounds per square inch, disregarding the power required for suction on and friction of the opposite end cylinder. However, this ratio of 85.8 to 195 is sufficient to reliably inject the fertilizer against the line pressure of 65 pounds per square inch.

Although in Figs. 2, 3, and 4, the ports have been shown as distributed in the individual cylinders for sake of explanation, it is to be understood that the connecting ports are either adjacent one another or are formed as part of the castings of the different cylinders, which will now be described in connection with the remaining figures.

Referring, now, to Figs. 5 to 10, inclusive, in conjunction with Figs. 1, 2, 3, and 4, power cylinder 7 is connected at its ends by a sliding fit to fertilizer cylinders 8 and 9 and sealed by static O ring seals 73 and 74. Felt wipers 80 and 81 keep precipitated materials in the water from lodging between pistons 85 and 86 and the walls of cylinders 8 and 9, respectively. The power piston 32 has seals 39 and 46 which are composed of tapered members 87 and 88, having bosses, one of which is shown at 92. On the bosses, and having a smaller internal diameter than the bosses, are square-section rubber rings, one of which is shown at 93, and enclosed in a teflon sleeve 94, the rubber rings exerting a force to provide pressure between the sleeves and cylinder walls. It is to be understood that materials having properties similar to teflon may also be used as sleeves. Compression plates 95 and 96 against the rubber control the desired pressure of the teflon sleeves against the cylinder walls, the plates being held in position by the threaded pistons 85 and 86 on studs, one of which is shown at 97 and fixed in position by set screws 98 and 99.

At the ends of pistons 85 and 86, seals 101 and 102, similar to seals 39 and 46, but of a smaller size, are provided as dynamic seals for the chemical pistons and static seals for back pressures in power cylinder 7. As shown for piston 85, a teflon sleeve 103 is mounted on a rubber ring 104 and held on the piston 85 by a bolt 105.

Referring, now, to the main cylinder 10 and its valve, a mandrel 107 is threaded to accommodate end nuts 108 and 109 and intermediate nuts at 42, 79, 50 and 55 for adjusting the positions of teflon seals 111, 112, 113, 114, 115, and 116 on the mandrel with respect to the ports in the main valve cylinder 10, seal 111 being shown in cross section with its rubber expander 118 and sleeve 119. Middle section 65 is a spacer sleeve. These seals are shown in Figs. 2, 3, and 4 and close and open the respective ports described above.

Referring to the pilot valve shown in elevation in Fig. 8 and in cross section in Fig. 9, a mandrel 120 has mounted thereon two teflon seals 121 and 122, seal 121 being shown in cross section with its rubber expander 124 and sleeve 125. Also threaded on mandrel 120 are two O ring mounts and spacer nuts 126 and 127, the O rings being shown at 128 and 129. Screws 130 and 131 hold the spacer nuts 126 and 127 in the desired adjusted positions.

Referring, now, to Figs. 6 and 7, showing the interconnecting castings of the cylinders, grooves 132, 133, 134 and 135 shown in Fig. 6, and grooves 137, 138, 139 and 140 accommodate the same rubber static seals when the castings are assembled. In the central portions of each casting, gaskets are used. When the castings are assembled, a front view of the pump is as shown in Fig. 1, the various interconnecting ports of Figs. 2, 3, and 4 being indicated. Fig. 8 shows end caps 100 and 106 for the pilot valve cylinder 12 and one of the end caps 123 for the main valve cylinder 10. Fig. 10 shows the arrangement of several of the port conduits in the castings of cylinders 7, 10 and 12.

The above-described pump, capable of injecting a liquid fertilizer into a high pressure irrigation water line in a desired mixture ratio, provides a uniform mixture at all times and is free from operation difficulties caused by precipitation of minerals from the fertilizer and silt from the water. The pump is actuated from the water line pressure, so it may be located at any point in the irrigation water line. The sleeve valve action prevents clogging since the valves are self-cleaning, and since the cylinders are all enclosed and connected as a unit, foreign matter, such as external dust and dirt, are prevented from reaching the internal pistons and valves.

I claim:

1. A hydraulic pump for injecting a first liquid into a second liquid under pressure comprising a power cylinder having a sliding power piston therein and adapted to be moved in two directions by said second fluid, an injection cylinder having an injection piston therein connected to each end of said power piston, a control valve cylinder having a sliding valve therein, and a main cylinder having a sliding valve therein, said cylinders being mechanically fixed with respect to each other and having interconnecting ports, said second liquid flowing through said main cylinder to said power cylinder for actuating said power piston and said injection pistons, said second liquid flowing from said power piston to said control valve cylinder after actuation of said power piston for actuating said sliding valve in said main cylinder, and said first liquid flowing through said main cylinder to and from said injection cylinders, said first liquid being maintained separate from said second liquid in different portions of said main cylinder.

2. A hydraulic pump in accordance with claim 1 in which said first liquid is a liquid fertilizer and said second liquid is irrigation water flow in a pipe to which said pump is connected.

3. A pump for operating in a water pipeline to inject liquid fertilizer from a source of fertilizer into said line comprising a main cylinder having a plurality of ports and a multiple valve therein, a control valve cylinder having a plurality of ports and a valve therein, a power cylinder, a fertilizer cylinder connected to each end of said power cylinder, a power piston within said power cylinder and a fertilizer piston in each of said fertilizer cylinders and attached to the ends of said power piston, said power cylinder having a plurality of ports therein, conduits connecting said pipe line to said main cylinder and said main cylinder to said power cylinder for conducting water from said pipeline through said main cylinder to said power cylinder to actuate said power piston in two directions, other conduits connecting said source of fertilizer to said main cylinder and other conduits connecting said main cylinder to said fertilizer cylinders for conducting fertilizer through said main cylinder to and from said fertilizer cylinders and to said pipeline when said fertilizer pistons are actuated by said power piston, and still further conduits connecting said power cylinder with said control valve cylinder for directing water in said power cylinder to said control valve cylinder to interconnect portions of said main cylinder to other portions of said main cylinder through said control valve cylinder, said water being maintained separate from said liquid fertilizer in different portions of said main cylinder.

4. A pump in accordance with claim 3 in which the diameter of said fertilizer cylinders are approximately one-half that of the diameter of said power cylinder.

5. A pump in accordance with claim 3 in which said cylinders are mechanically interconnected, said control valve cylinder being interposed between said power and main cylinders and at right angles thereto.

6. A pump in accordance with claim 3 in which said cylinders are mechanically interconnected, conduits being provided to conduct waste water from said power cylinder through said main cylinder, and waste water from said control valve and main valve cylinders through said power cylinder.

7. A pump in accordance with claim 3 in which said pistons and valves are provided with sliding seals, each including an outer sleeve and an inner resilient member exerting pressure between said sleeve and its respective cylinder wall.

8. A hydraulic pump for injecting a first fluid into a second fluid providing power for said injection comprising a power cylinder, a power piston in said power cylinder adapted to be intermittently moved in two directions by said second fluid, a cylinder at each end of said power cylinder for said first fluid, a piston in each of said end cylinders and connected to said power piston, a main cylinder parallel with said power cylinder, a multiple valve in said main cylinder and through which said fluids flow to said power cylinder and said end cylinders, a control cylinder between said power and main cylinders, a valve in said control cylinder, and a plurality of conduits between said cylinders, said conduits being connected so that said second fluid flows through said main cylinder to said power cylinder and then to said control cylinder and back through said power cylinder, operation of said valve in said control cylinder causing said second fluid to alternately flow through the central portion of said main cylinder to the ends of said main cylinder, said main cylinder valve controlling the flow of said first fluid to and from said end cylinders through said main cylinder.

9. A hydraulic pump in accordance with claim 8 in which all of said pistons and valves are provided with sliding seals for said conduits, each seal including an outer sleeve and an inner resilient member adapted to exert pressure between said sleeve and the wall of its respective cylinder.

10. A hydraulic pump in accordance with claim 8 in which the internal diameter of said end cylinders is approximately one-half (½) that of said power cylinder.

11. A hydraulic pump in accordance with claim 8 in which all cylinders are integrally connected in a fixed relationship.

12. A hydraulic pump in accordance with claim 8 in which said first fluid is a liquid fertilizer, a source therefor being provided, and said second fluid is water under pressure, a pipe source therefor being provided, the central portion of said main cylinder being connected to said pipe and the end portions of said main cylinder being connected to said source of liquid fertilizer through which said fertilizer is adapted to flow.

13. A pump for injecting fertilizer into irrigation water comprising a power cylinder, a piston in said power cylinder, a fertilizer cylinder connected to each end of said power cylinder, the axes of said cylinders being coincident, a piston in each of said fertilizer cylinders, each having an end connected to said power cylinder piston, a main cylinder parallel with said other cylinders, a pilot valve cylinder intermediate said power and main cylinders and having an axis perpendicular to the axes of said other cylinders, all of said cylinders having multiple ports therein, conduits interconnecting said ports, and a valve in each of said pilot and main cylinders actuated in opposite directions by said irrigation water pressure for actuating said fertilizer pistons to inject fertilizer contained in said fertilizer cylinders into said irrigation water, said irrigation water flowing through said main cylinder to and from said power cylinder and to and from said pilot valve cylinder, said fertilizer flowing through said main cylinder to and from said fertilizer cylinder, said irrigation water being maintained separate from said fertilizer in different portions of said main cylinder.

14. A pump in accordance with claim 13 in which said valves slide in said cylinders, said valves being provided with seals each having an outer cylindrical sleeve and an inner cylindrical resilient member for urging said sleeve toward the inner surface of its respective cylinder.

References Cited in the file of this patent
UNITED STATES PATENTS

| | | |
|---|---|---|
| 1,931,818 | Hartman | Oct. 24, 1933 |
| 2,090,069 | Richardson et al. | Aug. 17, 1937 |
| 2,445,540 | Smillie | July 20, 1948 |
| 2,510,373 | Bradley | June 6, 1950 |
| 2,803,260 | Wells | Aug. 20, 1957 |